United States Patent [19]

Barber

[11] Patent Number: 4,524,158

[45] Date of Patent: Jun. 18, 1985

[54] METHOD FOR DISPERSING FIBRILLATED FIBERS

[75] Inventor: Alan G. Barber, Woodbury, Conn.

[73] Assignee: Union Carbide Corporation, Danbury, Conn.

[21] Appl. No.: 578,856

[22] Filed: Feb. 10, 1984

Related U.S. Application Data

[63] Continuation-in-part of Ser. No. 361,546, Mar. 24, 1982, Pat. No. 4,439,561.

[51] Int. Cl.³ .............................. B01F 3/00; B01F 3/08
[52] U.S. Cl. ..................................... 523/130; 252/72; 252/8.5 LC; 252/363.5; 162/157.3
[58] Field of Search ............... 523/130, 177; 106/33; 252/72, 8.5 LC, 363.5; 162/157.3, 157.2

[56] References Cited

U.S. PATENT DOCUMENTS

| | | | |
|---|---|---|---|
| 3,352,696 | 11/1967 | Wallace et al. | 106/33 |
| 3,511,819 | 5/1970 | Bleasdale | 162/157.3 |
| 3,630,914 | 12/1971 | Nankee et al. | 106/33 |
| 3,644,208 | 2/1972 | Krueger | 252/72 |
| 4,187,143 | 2/1980 | Sander et al. | 162/157.3 |
| 4,374,211 | 2/1983 | Gallagher et al. | 524/35 |
| 4,387,178 | 6/1983 | Tracy et al. | 524/514 |

*Primary Examiner*—John Kight
*Assistant Examiner*—Nathan M. Nutter
*Attorney, Agent, or Firm*—James L. Sonntag

[57] ABSTRACT

A method for forming a suspension of a fibrillated fiber in an alcoholic medium which comprises (i) providing a mixture comprising alcohol, water, and dispersing agent, wherein the concentration of the water is at least about 15 wt. %; (ii) dispersing a fibrillated fiber in the mixture of (i) to provide a fibrillated fiber predispersion; and (iii) diluting the predispersion of (ii) with alcohol to provide a final dispersion of fibrillated fiber in an alcoholic medium.

25 Claims, No Drawings

METHOD FOR DISPERSING FIBRILLATED FIBERS

RELATED APPLICATIONS

This application is a continuation-in-part to copending application Ser. No. 361,546, titled "SEALANT COMPOSITION AND METHOD", filed Mar. 24, 1982, now U.S. Pat. No. 4,439,561 by Alan Gill Barber.

FIELD OF THE INVENTION

The present invention relates to a method for dispersion of fibers in an alcoholic medium.

In particular the invention relates to the dispersion of fibrillated fibers in alcoholic antifreeze mediums to produce antifreeze compositions useful for the sealing of leaks in heat exchange systems, such as automobile cooling systems and the like.

BACKGROUND OF THE INVENTION

So called "stop leak" compositions have long been used for stopping leaks in automobile cooling systems. Many of these compositions are aqueous suspensions of a particulate material that is entrained in the leak, thereby plugging it. Particulate materials that were used include linseed meal and metal flakes. However, these compositions are often not effective in completely stopping the leak, particularly under pressure, resulting in excessive loss of the coolant.

For many years stop leak compositions were improved by the addition of an asbestos fiber to the particulate material. However, the use of asbestos was not always effective and there are now known to be health and environmental problems associated with the use of asbestos.

It is also known to use asbestos fiber in an antifreeze composition to provide some leak stopping ability to the antifreeze. These antifreezes can be made by dispersing the asbstos fiber directly into ethylene glycol.

In the above-cited Ser. No. 361,546 is disclosed a stop leak composition that is substantially more effective than the above-discussed prior art stop leak compositions in the stopping of leaks. Therein is disclosed a composition for the stopping of leaks in a leaky container, preferably a heat exchange system such as automobile cooling systems. Which comprises a suspension in a liquid medium of a particulate material of a size and in an amount sufficient to become entrained in the leak, and fibrillated fiber coacting with the particulate material to seal the leak by an entwining action.

In copending application Ser. No. 578,857 "Leak Stopping Composition and Method", filed concurrently herewith by A. G. Barber, is disclosed a composition for the stopping of leaks in a coolant system which comprises a suspension in a liquid medium, preferably an antifreeze composition, of a fibrillated fiber in an amount which is effective for the stopping of leaks.

Typically stop leak compositions are supplied to the consumer in the form of a concentrate that is added to the fluid of the coolant system. In the case of a preferred stop leak of Ser. No. 361,546 above, a concentrate is formed comprising an aqueous suspension of a particulate material and a fibrillated fiber. This concentrate is then added by the consumer to the fluid of the cooling system, which is typically an antifreeze composition. The concentrate is then diluted by and dispersed throughout the cooling system to provide an effective amount of particulate material and fibrillated fiber to plug leaks in the cooling system.

An alternative method of supplying a stop leak to the consumer is to provide an antifreeze composition, which is almost entirely an alcohol containing small amounts of corrosion inhibitors and other additives, and also containing a stop leak material. Thus, as the consumer periodically adds to or replaces the antifreeze in his automobile cooling system, a stop leak composition is added automatically.

Providing an antifreeze to the consumer containing a stop leak, such as a stop leak of above-cited, Ser. No. 361,546 requires the addition of extra process steps and ingredients that add to the expense of manufacture but do not increase its effectiveness in most of the systems in which it used, since most cooling systems in which antifreeze is used, are leak-free. However, there are consumers, who, as a precautionary measure, wish to add a stop leak composition to their cooling system as they add antifreeze, even though their cooling system is free of leaks. In order to meet the need of these consumers, it would, therefore, be desirable to provide an antifreeze composition with a leak stopping ability in addition to providing the normal antifreeze not having leak stopping ability. However, considering the problems described above, such an antifreeze composition would have to be economical to manufacture and have a minimum amount of additional addivites. Also the manufacture of such a "stop leak" antifreeze should be easily accomplished by a minimal alteration of existing manufacturing practices for making antifreeze. It would then be easy to quickly modify the manufacturing process to make either a stop leak containing or a stopleak free antifreeze.

In order to prepare a suspension of fibers in a liquid medium to make a stop leak, the fiber is dispersed in the medium using a mixer or the like. When a nonfibrillated fiber is used, such as asbestos, the fiber can be effectively dispersed by merely mixing the fiber directly into aqueous or alcoholic media. However, it was found that attempts to disperse fibrillated fibers, such as fibrillated polyamide fibers, were only partially successful, since many of the fibers adhered together in clumps and were not dispersed. In a medium that is a predominately water, this problem can be solved, as is disclosed in the above-cited Ser. Nos. 361,546 and 578,857, by using dispersants, such as various surfactants, and clay suspending agents.

These dispersants are satisfactory when the liquid medium is mostly water. However, when the fibrillated fibers are dispersed directly in alcoholic media, the problem of incomplete dispersion of the fibers also exists, the fibrillateed fibers being only partially dispersed with many of the fibers remaining in undispersed clumps. The dispersants used in aqueous media to solve the clumping problem are not effective in eliminating the clumping problem in alcoholic media.

Therefore, in the manufacture of alcoholic-based stop leak antifreezes containing a minimum of added water, and wherein a fibrillated fiber is dispersed therein, there has been a continuing difficulty in dispersing fibrillated fibers. Therefore, it would be desirable to have a method to effectively disperse fibrillated fibers in alcoholic media with a minimum of added water, to form stop leak antifreezes. Accordingly, an object of the invention is to provide a method for the dispersion of fibrillated fibers in alcholic media with a minimal addition of water.

SUMMARY OF THE INVENTION

In its broadest aspect, the invention is a method for forming a suspension of a fibrillated fiber in an alcoholic medium, which method comprises (i) providing a mixture comprising alcohol, water, and dispersing agent, wherein the concentration of the water is at least about 15 wt.%; (ii) dispersing a fibrillated fiber in the mixture of (i) to provide a fibrillated fiber predispersion; and (iii) diluting the predispersion of (ii) with alcohol to provide a dispersion of fibrillated fiber in an alcoholic medium. Unless otherwise indicated, weight percent (wt.%) as used herein, is based upon the total weight.

DESCRIPTION OF THE INVENTION

The method of the invention is easily adaptable to existing manufacturing methods for making antifreeze. A stop leak composition, comprising a suspension of a fibrillated fiber in an alcoholic antifreeze composition, is made with a minimum of additional equipment costs and material handling. Such a stop leak antifreeze made according to the invention can also be made with a minimum of further additives. Only the fibrillated fiber, and small amounts of a suspending agent and water, are typically the only additional materials in the antifreeze composition, and these are present in only minor amounts.

The discovery that fibrillated fiber can be dispersed in a mixture comprising mostly alcohol and as little as 15 weight percent water and a dispersing agent enables one to make a predispersion, and by diluting this predispersed mixture in a large amount of an alcohol based antifreeze, one can make a stop leak containing antifreeze with a minimum of added water. Although there is only a small amount of water remaining after dilution of the predispersion with alcohol, the fibrillated fiber remains substantially fully dispersed.

The process of the invention avoids the problems encountered when trying to disperse the fibrillated fiber directly into the alcoholic antifreeze and yet provides a desired low water content in a final fully dispersed antifreeze mixture.

The amount of fibrillated fiber dispersed in the mixture of alcohol, water, and dispersing agent is such to provide the desired concentration in the final antifreeze mixture. In order to provide the smallest amount of added water, the concentration of the fibrillated fiber in the predispersed mixture is as high as is practical and the dilution ratio with the alcohol also is preferably high.

In a preferred practice of the invention, a mixture is provided containing about 80 wt.% ethylene glycol, about 18 wt.% water, and about 2 wt.% of a clay dispersing agent. In this mixture is dispersed about 1.5 wt.% of a polyamide fibrillated fiber to form a fibrillated fiber predispersion. The predispersion is diluted into an ethylene glycol based antifreeze at a ratio of 50 parts antifreeze to 1 part predispersion. This provides a final concentration in the antifreeze of fibrillated fiber of about 0.03 wt.%, and a concentration of added water of about 0.4 wt.%.

As used herein "fibrillated fiber" means fiber that is frayed or split along its length or a fiber wherein the ends are split and splayed out, resulting in a multitude of very fine fibrils upon a core fiber. The smaller and thinner fibers or fibrils formed on the core fiber by the fraying or splitting are known as fibrillae. The fibrillated fibers used in the invention can be formed from fibers that are axially oriented and are less strongly bonded in the transverse direction, such as wood, and certain synthetic fibers described below.

A commonly known fiber that can be fibrillated is wood fiber, which may be fibrillated by controlling the conditions under which the fiber is cut. The fibrillating of wood fiber is explained by Julino Grant in Laboratory Handbook of Pulp and Paper Manufacture, 2nd Edition, 1961, Great Britain, at pp. 147–152.

Fibrillated fibers made from synthetic materials are also contemplated for use in the invention. Examples of synthetic fibrillated fibers and methods for making them are disclosed in U.S. Pat. No. 3,097,991, issued to W. A. Miller, et al. on July 16, 1963, and U.S. Pat. No. 3,560,318, issued to W. A. Miller, et al. on Feb. 2, 1971. Processes for making synthetic fibrillated fibers typically involve the cutting and beating of a fiber of a film of an oriented polymer, in for example a paper beater.

Synthetic polymers can be formed into oriented films or fibers by methods known in the art. These typically involve the controlling of the extrusion process and/or a stretching process to orient the polymer in the film or fiber. The oriented fibers or films must be stronger in an axial direction and weaker in a transverse direction to an extent to allow fibrillation. Optionally the polymer can be coextruded with an incompatible polymer, as is described in the above cited patents, to more readily form a fiber or film that is strong in an axial direction and weak in a transverse direction. This can be accomplished be addition of the incompatable polymer to the polymer melt or the polymer solution or "dope" that is to be extruded. Certain polymers such as poly(imino-1,4-phenyleneiminoterephthaloyl), described below, may be formed in a highly oriented state with long, strong, axial, "grains" separated by weaker amorphous regions, and may not require the use of an incompatable polymer to form fibrillable fibers. The formation of fibrillated fiber from synthetic polymers is well know in the art.

The fibrillated fibers used in the invention should be fibrillated to the extent to provide a surface area greater than about 1 square meter per gram, preferably greater than about 10 square meters per gram. The surface area is measured by the B-E-T method as described in Brunauer, et al. in J. Am. Chem. Soc., 60, 309 (1938).

To provide a stop leak composition with sealing action, the length of the fiber should have an average length greater than about 1 millimeter. The fibrillated fiber should not be too long to interfere or hinder the fluid flow within the coolant system. For use in automobile coolant systems the length of the fibrillated fiber should be between about 1 millimeter and about 7 millimeters.

The fibrillated fibers used in the invention should preferably be of a substance that is stable. By "stable" is meant a substance that doesn't significant react or degrade in the environmental conditions which may occur in the coolant system in which the composition of the invention is used. For use in automobile cooling systems, this would be a substance that is thermally stable up to about 300° F. (150° C.), preferably up to about 500° F. (260° C.), and is unreactive with the components of the coolant, such as water, corrosion inhibitors, antifreeze compositions and other substances commonly found in automobile cooling systems.

Any fiber that is fibrillated and is stable in the environment of use is a suitable substance for use in the invention. Preferably the fibrillated fiber is of a synthetic polymeric substance that can be made into a fibrillated fiber. Suitable polymeric materials include polyamides and polysulfones.

The preferred fiber for use in the invention is a fiber, preferably fibrillated, comprising a polymer consisting essentially of the recurring units selected from the group;

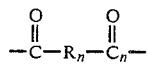 (I)

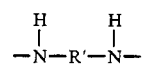 (II)

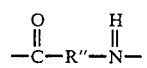 (III)

with the proviso that

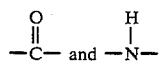

are present in the polymer in substantially equimolar amounts, and wherein R, R', and R", which may the same or different, are divalent radicals, n may be zero or the integer one, and wherein the R, R', and R" radicals in the polymer are saturated or unsaturated aliphatic or ringed aliphatic radicals containing 1 to 10 carbon atoms, or single ringed or fused multiringed carbocyclic, or heterocyclic aromatic radicals, or a series of such radicals. The R, R', or R" may contain substituents and other radicals that do not unduly interfere with the ability to form fibrillable fibers, for example through cross-linking, or cause the fiber to become too unstable or too chemically reactive for practice of the invention.

The preferred polymers of the class, described above, for use in the fibers of the invention are those where the R, R', and R" in the polymer are single rigid radicals with extended bonds or a series of such rigid radicals which are linked together directly by extended bonds. Thus, the essential portion of the polymer consists of polyamide units (including polyoxamide units when n is zero), which provide stiff chains.

By the expression "rigid radicals" is meant (a) the ring radicals: single ring or fused multiring aromatic carbocyclic or heterocyclic radicals, trans-1,4-cyclohexylene

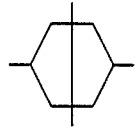

and (B) the linear unsaturated radicals: vinylene

and acetylene —C≡C—.

It will be understood that monomers containing amino groups directly attached to linear unsaturated radicals are not stable and hence vinylene or acetylene cannot serve as R' or that portion of a R" radical attached to

By the expression "extended bonds" is meant chain-extending bonds of the radical (as determined by the true bond angles) which are essentially coaxial or parallel and oppositely directed, such as in p-phenylene and 1,5-naphthylene.

A more preferred class of polymers of the group described above are those polyamides (n being the integer one) wherein at least 50 mole percent of the total of R, R', R" radicals are wholly aromatic. An even more preferred class of these polymers are those polyamides wherein R, and R' are selected from the group 1,4-phenylene, 4,4'-biphenylene, 2,6-naphthylene, 2,5-pyridine, trans-vinylene and trans-1,4-cyclohexylene and R" is 1,4-phenylene with the proviso that at least 50 mole percent of either R or R' radicals are 1,4-phenylene.

The most preferred fiber consists essentially of poly(imino-1,4-phenyleneiminoterephthaloyl) which is a polyamide polymer characterized by the repeating unit,

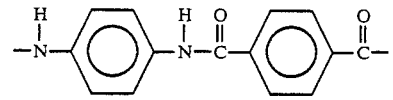

this polymer is available commercially under the trademarked name "KEVLAR" from E. I. DuPont de Nemours & Co., Center Road Building, Wilmington, Del., in a "pulp" form. This "pulp" consists essentially of short fibrillated fibers or fibers with a multitude of fibrillae or very fine fibrils upon a core fiber. Kevlar pump is described by Merriman in "Kevlar Aramid Pulp for Paper Making". reprinted from 1981 TAPPI Non-Woven Fibers and Binders Seminar Notes, TAPPI, 1981. The method for forming fibrillated fibers of this polymer is not disclosed, but the fibrillated fibers of this polymer are probably formed in a manner similar to the methods for forming fibrillated fibers from synthetic materials, which are discussed the above Ser. Nos. 361,546 and 578,857. The KEVLAR pulp, fibrillated fibers are most preferred in stop leak compositions because of the fibrillations, high thermal stability and inertness to chemical and biological action.

The alcohol used in the method of the invention to form the mixture for the predispersion, or to dilute the predispersion to form the final dispersion, can be one or more of the group consisting of monohydric alcohols, such as methanol or ethanol, propanol, and the like; and polyhydric alcohols, such as ethylene glycol, propylene glycol, diethylene glycol, glycerine, dipropylene glycol, 1,3-butylene glycol, polyethylene glycols, and polypropylene glycols, polyhydric alcohols, and the like.

Preferably the alcohol used to dilute the predispersion is an antifreeze composition used in automobile coolant systems and the like. Antifreezes typically contain monohydric alcohols, and/or polyhydric alcohols, such as the above, as the principal components. Preferably the antifreeze composition is principally ethylene glycol. Antifreezes also typically contain a minor amount of water and various additives, such as corrosion inhibitors. The antifreeze is typically used by adding it to a cooling system and diluting it with water to achieve the desired degree of antifreezing capability.

The antifreeze may include additives commonly used in antifreeze compositions. These include, for example, known corrosion inhibitors used to protect surfaces of aluminum, iron, and other metals or material that may be used as a material of construction of the heat exchange system or other surface that may contact the liquid antifreeze medium. The corrosion inhibitors include silicone-stabilized silicone/silicate copolymer corrosion inhibitors, molybdates, alkanolamine salts of silicates, borates, phosphates, benzoates, hydroxyl benzoates or acids thereof, silicones, dispersible oils, alkali metal nitrates, tolyltriazole, alkali metal or alkanolamine salts of silicates, mercaptobenzothiazole and the like, or mixtures thereof. If one or more of the known inhibitors are employed, the sum total of all inhibitors should be used in an "inhibitory effective amount", i.e., and amount sufficient to provide some corrosion inhibition with respect to the surfaces to be protected. Corrosion inhibitors are described in U.S. Pat. Nos. 3,341,469 and 3,337,496.

Other typical optional additives would include wetting agents and surfactants such as, for example, known ionic and nonionic surfactants such as the poly(oxyalklene) adducts of fatty alcohols; antifoams and/or lubricants such as the well known polysiloxanes and the polyoxyalklene glycols, as well as any other minor ingredients known in the art that do not adversely affect the corrosion resistance sought to be achieved.

Suitable dispersants for use in the invention in the mixture used to form the predipersion of fibrillated fiber in the alcohol/water mixture include surfactants commonly known in the art. Suitable surfactants include quaternary ammonium compositions, such as quaternary ammonium chloride.

Various alumino-silicate clays used as suspending agents may also be used as dispersants. Suitable clays include various alumino-silicate clays that are known in the art for use as suspending agents, such as bentonite type clays. Suitable clays include Bentonite GPG-30, HPM-20, and Volclay KWK, manufactured by American Colloid Co., Skokie, Ill., and available from Whittaker, Clark & Daniels, Inc., 1000 Coolidge Street, South Plainfield, N.J. A preferred clay is a bentonite clay such as Volclay KWK.

The method of the invention is carried out by first dispersing the fibrillated fiber in a mixture comprising alcohol, water, and dispersing agent, wherein the mixture contains at least about 15 wt.% water. After formation of the predispersion, the predispersion is diluted with alcohol, preferably an alcoholic antifreeze composition, to provide an alcohol/fibrillated fiber final dispersion.

It was found that a stable predispersion of fibrillated fiber could be formed in the mixture of alcohol, water and dispersing agent as long as there is water in the indicated amount and a dispersing agent present. At water concentrations in the predispersion below about 15 wt.%, as for example 10 wt.%, a uniform predispersion, free of clumped fibrillated fibers, could not be formed. A final dispersion made by diluting such a non-uniform predispersion with alcohol, although it has some stop leak ability, the stop leak ability is significantly less than that achieved in substantially dispersed stop leaks made by the method of the invention. When the water concentration in the predispersion was in the area of about 15 wt.%, or above, a substantially complete and clump-free predispersion of the fibrillated fiber can be formed. After diluting the clump-free dispersion with alcohol, a final dipersion with the fibrillated fiber completely dispersed and with optimum stop leak ability is formed.

Since it is desirable to introduce as little added water as possible to the final dispersion, the fibrillated fiber predispersion preferably contains the minimum amount of water necessary to form a fibrillated fiber predispersion, between about 15 and about 20 wt.% water. By "added water" is meant water added to the final dipersion through practice of the invention, i.e. in the original mixture of alcohol, water, and dispersing agent. Preferably the amount of added water in the final dispersion is less than about 0.4 wt.%. Commercial antifreeze compositions typically contain between about 2 and about 3 wt.% total water, mostly introduced as an impurity in the alcohol, as rinse water, and as part of hydrated additives. Preferably, the amount of added water introduced by practice of the invention is adjusted such that the total water in the antifreeze is less than about 3.5 wt. %, preferably at about 3 wt. %. If little or no water is introduced to the final antifreeze composition from sources other than by practice of the invention, the amount of added water introduced by practice of the invention may be correspondingly increased.

The concentration of fibrillated fiber in the predispersion will depend on the dilution ratio and the final concentration of the fibrillated fiber in the final dispersion. The weight dilution ratio is typically greater than about 30 parts alcohol to 1 part predispersion. In order to maintain the preferred low water addition of about 0.4 wt.% or less, a dilution ratio of the predispersion to alcohol should be not be less than about 50 parts alcohol or antifreeze to 1 part predispersion.

Preferably the concentration of fibrillated fiber in the final dispersion is greater than about 0.015 wt.%, preferably at about 0.03 wt.%. The concentration of fibrillated fiber may be higher, but the amount of fibrillated fiber above about 0.3 wt. % would not generally add significantly to the leak stopping ability of the antifreeze. The concentration of the fibrillated fiber in the predispersion, is preferably in the range from about 1 to about 2 wt.%, preferrably at about 1.5 wt.%, of fibrillated fiber.

In a typical practice of the invention, the concentration of water in the predispersion is about 20 wt.%, the concentration of the fibrillated fiber in the predisperson is about 1.5 wt.%, the dilution ratio is about 50 parts alcoholic antifreeze to 1 part predispersion, and the final concentration of fibrillated fiber in the final dispersion is about 0.03 wt.%.

The concentration of the dispersing agent will depend upon the properties of the dispersing agent used. When the preferred bentonite clays are used, amounts in the range between about 2 wt.% and 5 wt.% of the predispersion have been found suitable.

The predispersion is preferably made by mixing the dispersing agent, preferably a bentonite clay, in water to form a uniform water/clay dispersion. An alcohol, preferably ethylene glycol, is then mixed to form a thin alcohol/water/clay suspension. Typical concentrations are about 2 weight percent of a bentonite clay, about 80 weight percent ethylene glycol, and about 18 weight percent water. To this is blended the fibrillated fiber, preferably KEVLAR pulp fibrillated fiber, with a high speed mixer, such as a propeller mixer, in an amount of about 1.5 weight percent of the fiber, based on the weight of the glycol/water/clay mixture to form a predispersion. The predispersion is then added to an ethylene glycol based antifreeze composition at a ratio to give a composition of about 0.03 weight percent fibrillated fiber, based on the total weight. The antifreeze composition preferably additionally contains corrosion inhibitors. The resulting composition is a stop leak antifreeze with less than about 0.4 wt.% added water.

As previously mentioned, an attempt to disperse the fibrillated fiber directly in the antifreeze would have resulted in the fiber remaining as incompletely dispersed clumps. By practice of the invention it is possible to obtain a dispersion of fibrillated fiber in an antifreeze that is essentially alcohol. This is accomplished by addition of very little water and without the presence of undispersed clumps of fiber.

The following examples are only illustrative of the invention and are not intended to be limitative thereto.

EXAMPLE I

Compositions made according to the invention comprising a suspension of a fibrillated fiber in an antifreeze composition were made and tested for their stop leak ability. The stop leak ability is a measure of the effectiveness of the dispersion of the fiber.

A bench test unit was used to measure the stop leak effectiveness of the compositions tested. The bench test unit was made to simulate pressure and temperature conditions typically found in an automobile cooling system. It comprised a vertical closed cylindrical reservoir $3\frac{7}{8}$ inches (9.8 cm) in diameter and $5\frac{1}{2}$ inches (14.0 cm) high fitted with a flanged leakage adaptor $1\frac{1}{2}$ inches (3.8 cm) from the reservoir bottom, and a pressure fitting above the fluid line in the reservoir. The pressure fitting was attached to a pressure regulated compressed air source such that any desired pressure in the reservoir could by achieved. The reservoir was also fitted with a thermoregulator (Fenwal-Thermoswitch, size No. 17100 115 V, Scientific Glass and Apparatus Co.); and a heater (Chromaloy R1-250 115 V, 250 W). Attached to the reservoir was an inlet and outlet for circulating liquid using an external pump. The inlet was a $\frac{3}{8}$ inch (1.0 cm) brass tube and was located about $1\frac{1}{2}$ inches (3.8 cm) from the reservoir bottom. This tube was curved at a 45 degree angle to divert the inlet stream from the leak opening and to give the liquid a clockwise swirling motion. Also provided were a pressure gauge and a bimetalic type thermometer. The fluid capacity of the entire system was about 0.9 liters. The leakage adaptor was $2\frac{3}{8}$ inches (6.0 cm) in diameter with a $\frac{3}{4}$ inch (1.9 cm) high base and had a $\frac{1}{2}$ inch (1.3 cm) deep threaded fitting for attachment to the reservoir. To the base was bolted a $2\frac{3}{8}$ inch (6.0 cm) diameter plate of nonmagnetic stainless steel in the 300 series which contained the desired hole or leak. For crevice leaks, the plate consisted of two abutting $\frac{1}{4}$ inch (0.6 cm) thick sections with a notch cut into one section to provide a crevice $\frac{1}{2}$ inch long (1.3 cm) and of the desired width. For pin-hole leaks, the plate consisted of a plate with a circular hole of the desired diameter. A catch pot was provided to catch the leaking fluid.

Before each test the test unit was cleaned by disassembly of the unit, mechanically removing any stop leak material and flushing the unit by pumping through it a rinse solution of water and detergent. The flushing is repeated until the unit is free of all stop leak material.

The tests were accomplished by adding to the test unit water and the stopleak antifreeze composition being tested, in the amounts indicated below. The unit was then closed, the pump was started and the temperature of the fluid was raised to 190° F.±5° F. (88° C.±3° C.). The fluid flow rate was set at about 11,000 grams/minute. The unit was so operated with no pressure for 5 minutes after which the pressure was built up to 15 psig (103 kilopascals) over $2\frac{1}{2}$ minutes by incrementally increasing the pressure by $2\frac{1}{2}$ psig (17 kilopascals) every 30 seconds. The pressure was held at 15 psig (103 kilopascals) for $5\frac{1}{2}$ minutes or until the leak sealed. The volume of the fluid lost during the test was noted.

The fiber used in this example was the KEVLAR fibrillated fiber described above. The average fiber length was between about 1 mm and 4 mm with an average length of about 2 mm. The surface area was about 10 square meters per gram. The fiber was designated "Merge 6F218".

The samples of the invention were made by dispersing 10 parts Volclay KWK in 90 parts water containing 0.03 wt.% soda ash. This water/clay mixture was then mixed into ethylene glycol to form a mixture alcohol, water, and dispersing agent, with 80 weight percent ethylene glycol, based on the total weight. To the above glycol/water/clay mixture was added KEVLAR pulp fibrillated fiber to provide a fibrillated fiber concentration of 1.5 wt.% KEVLAR based on the total weight of the predispersion. The KEVLAR pulp fibrillated fiber was dispersed in the glycol/water/clay mixture by using a high speed propeller mixer and adding the fibrillated fiber gradually to the vortex. The stirring was continued until the mixture is uniform. The predispersion was then mixed with an ethylene glycol based antifreeze containing about 3 wt. % water (PRESTONE II (Trademark), manufactured by Union Carbide Corp., Danbury, CT) in an amount to give the desired amount of fibrillated fiber in the antifreeze.

The compositions of the invention (nos. 4a–f), and samples of the same antifreeze with no fiber (Nos. 5a–d), were tested in the above-described test unit, by adding 300 ml of antifreeze and 600 ml of water to the test unit. The leak was a pin-hole leak 0.013 inches (0.33 mm) in diameter. The results are summarized below in Table A;

TABLE A

| No. | Stop Leak Ability | |
|-----|---------------|---------------------------|
|     | Wt. % Fiber | Average Coolant Loss (ml) |
| 4a  | 0.03 | 20 |
| 4b  | 0.03 | 20 |
| 4c  | 0.03 | 7 |
| 4d  | 0.03 | 5 |
| 4e  | 0.03 | 47 |
| 4f  | 0.03 | 14 |
| 5a  | 0 | 180 |
| 5b  | 0 | 210 |
| 5c  | 0 | 150 |
| 5d  | 0 | 150 |

The above results show that there was an effective dispersion of the KEVLAR fibrillated fiber in the ethylene glycol antifreeze composition. For pin-hole leaks of the size tested, a fluid loss in the area of 150 ml or greater is considered to show little or no leak-stopping ability, as demonstrated by samples 5a–5d containing no fiber. This example shows that compositions made by the method of the invention and having a fibrillated fiber are effective in sealing pin-hole leaks. The leak-stopping ability was provided by the dispersed fiber, as demonstrated by comparison with the compositions wherein no fiber was present.

EXAMPLE II

Additional tests were run with compositions made by the method of the invention containing a fibrillated fiber. The fibrillated fiber was the same used in Example I. The composition according to the invention was made as in Example I except the glycol/water/clay mixture comprised essentially of 80 wt.% ethylene glycol, 15 wt.% water, and 5 wt.% Volclay KWK dispersing agent. The fibrillated fiber was dispersed in the glycol/water/clay mixture as in Example I to give a predispersion with 1.5 weight percent fibrillated fiber, based on the predispersion total weight. The predispersion was mixed with the antifreeze composition of Example I, to give a final antifreeze/fibrillated fiber dispersion with about 0.05 wt.% fibrillated fiber. The compositions were tested as described in Example I, except 450 ml antifreeze and 450 ml water were added to the test unit. The fluid loss was measured during the unpressurized time period (unpressurized loss), and the pressurized time period (pressurized loss). After the pressurized time period, the seal was opened by inserting a wire or flat piece of metal into the leak. After opening the leak the apparatus was run for one minute and the fluid loss since the opening (reseal loss) was measured. The tests were run using three sizes of crevice leaks and a pinhole leak. The results are summarized in Tables B and C below. The values shown in Tables B and C are the average values of three tests. The asterisk(*) denotes a loss greater than 500 ml and indicates that no seal was formed in the leak.

TABLE B

| Antifreeze Compositions with Fiber, Crevice Leaks | | | |
|---|---|---|---|
| | Width Crevice Leak (in) | | |
| .05 wt. % Fibrillated Fiber | 0.005 | 0.008 | 0.010 |
| Unpressurized Loss (ml) | 4 | 10 | 7 |
| Pressurized Loss (ml) | 27 | 183 | * |
| Reseal Loss (ml) | 57 | 212 | — |
| TOTAL (ml) | 88 | 405 | * |

TABLE C

| Antifreeze Compositions with Fiber, Pinhole Leak (0.0135 in) | |
|---|---|
| 0.05 wt. % Fibrillated Fiber | |
| Unpressurized Loss (ml) | 2 |
| Pressurized Loss (ml) | 4 |
| Reseal Loss (ml) | 1 |
| TOTAL (ml) | 7 |

As shown by the data in the above Tables B and C, the compositions made by the method of the invention had the fibrillated fiber effectively dispersed as demonstrated by their leak stopping ability.

EXAMPLE III

This is a comparative example and does not illustrate the invention.

A fibrillated fiber was dispersed directly into ethylene glycol. The fibrillated fiber of Example I was dispersed in essentially pure ethylene glycol using a high speed mixer by adding the fibrillated fiber to the vortex to give a ethylene glycol/fibrillated fiber predispersion containing about 1.5 wt.% fibrillated fiber. Visual inspection of the predispersion showed a nonuniform dispersion with several clumps of undispersed fibers present. The predispersion was diluted with the ethylene glycol antifreeze of Example I at a ratio of 50 parts antifreeze to 1 part predispersion to give a final dispersion containing 0.03 wt.% fibrillated fiber. The final dispersion was tested, as in Example I, by adding 300 ml final dipersion and 600 ml water to the test unit. The leak was a pin-hole leak of 0.013 inches (0.33 mm) in diameter. The results are summarized in Table D;

TABLE D

| | Stop Leak Ability Comparative Method | |
|---|---|---|
| No. | Wt. % Fiber | Average Coolant Loss (ml) |
| 1 | 0.03 | 110 |
| 2 | 0.03 | 60 |
| 3 | 0.03 | 140 |

The average coolant loss (103 ml) of the tests of Table D compares unfavorably with the average coolant loss for compositions of Example I made according to the invention shown in Table A above, wherein the average coolant loss was only about 19 ml. This significantly higher loss is a measure of the incomplete dispersion of the fibrillated fiber in the ethylene glycol antifreeze. The lower loss for the compositions made according to the invention shows a substantially complete dispersion, which allows for optimum use of the fibrillated fiber in forming a seal in the leak. The composition of this example is not effective as a stop leak composition, because many of the fibrillated fibers, being bound together in clumps, are not fully dispersed and are not available in a suspended form to form a seal in a leak.

Use of a dispersion agents such as a clay suspending agent to the ethylene glycol before the fiber is dispersed in the predispersion would be ineffective, since the suspending agent would merely settle out and would, therefore, not aid dispersion. Also, continued stirring of the ethylene glycol would not break up the undispersed clumps of the fiber.

Although particular embodiments of the invention have been described in detail, it will be recognized that modifications of these embodiments are contemplated and within the scope of the invention.

What is claimed is:

1. A method for forming a suspension of a fibrillated fiber in an alcoholic medium which comprises (i) providing a mixture comprising alcohol, water, and dispersing agent, wherein the concentration of the water is at least about 15 wt.%; (ii) dispersing an undispersed fibrillated fiber in the mixture of (i) to provide a fibrillated fiber predispersion; and (iii) diluting the predispersion of (ii) with alcohol to provide a final dispersion of fibrillated fiber in an alcoholic medium.

2. The method of claim 1 wherein the final dispersion contains at least about 0.015 wt.% fibrillated fiber, based on the total weight of the final dispersion.

3. A method of claim 1 wherein the final dispersion contains at least about 0.03 wt.% fibrillated fiber, based on the total weight of the final dispersion.

4. The method of claim 1 wherein the fibrillated fiber comprises a polymer consisting essentially of the recurring units selected from the group;

(I)

-continued

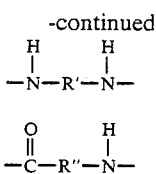

with the proviso that

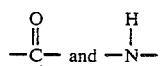

are present in the polymer in substantially equimolar amounts, and wherein R, R', and R", which may the same or different, are divalent radicals, n may be zero or the integer one, and wherein the R, R', and R" radicals in the polymer are saturated or unsaturated aliphatic or ringed aliphatic radicals containing 1 to 10 carbon atoms, or single ringed or fused multiringed carbocyclic, heterocyclic aromatic radicals, or a series of such radicals.

5. The method of claim 4 wherein the R, R', and R" in the polymer are single rigid radicals with extended bonds or a series of such rigid radicals which are linked together directly by extended bonds.

6. The method of claim 5 wherein R, and R' are selected from the group 1,4-phenylene, 4,4'-biphenylene, 2,6-naphthylene, 2,5-pyridene, trans-vinylene and trans-1,4-cyclohexylene and R" is 1,4-phenylene with the proviso that at least 50 mole percent of either R or R' radicals are 1,4-phenylene.

7. The method of claim 1 wherein the fibrillated fiber comprises poly(imino-1,4-phenyleneiminoterephthaloyl).

8. The method of claim 1 wherein the alcohol in the mixture of (i) and the alcohol used to dilute the predispersion in (iii) to form the final dispersion comprises ethylene glycol.

9. The method of claim 8 wherein the alcohol used to dilute the predispersion additionally contains a corrosion inhibitor in an inhibitory amount.

10. The method of claim 1 wherein the predispersion is diluted with alcohol at a ratio of at least about 30 parts alcohol to 1 part predispersion.

11. The method of claim 1 wherein the predispersion is diluted with alcohol at a ratio of at least about 50 parts alcohol to 1 part predispersion.

12. The method of claim 1 wherein the fibrillated fiber has a length not less than about 1 mm.

13. The method of claim 1 wherein the fibrillated fiber has a length between about 1 mm and 7 mm.

14. The method of claim 1 wherein the fibrillated fiber has a surface area greater than about 1 square meter per gram.

15. The method of claim 1 wherein the fibrillated fiber has a surface area greater than about 10 square meters per gram.

16. The method of claim 1 wherein the final dispersion of step (iii) has less than 0.4 wt.% water added from the mixture in step (i).

17. The method of claim 1 wherein the final dispersion has a total water content of less than about 3.5 wt. %, based on the total weight of the final dispersion.

18. The method of claim 1 wherein the final dispersion has a total water content of about 3 wt. %, based on the total weight of the final dispersion.

19. The method of claim 1 wherein the mixture of step (i) contains between about 15 and about 20 weight percent water.

20. The method of claim 1 wherein the dispersing agent is an alumino-silicate clay.

21. The method of claim 20, wherein the alumino-silicate clay is present in an amount between about 2 and about 5 percent of the weight of the predispersion.

22. The method of claim 1, wherein step (i) comprises (a) mixing the dispersing agent in water to provide a dispersion of clay and water, (b) adding an alcohol to the clay and water dispersion of (b) to provide the mixture comprising alcohol, water, and dispersing agent.

23. The method of claim 1, wherein the fibrillated fiber is unreactive with water, and alcohol.

24. The method of claim 23, wherein the fibrillated fiber is thermally stable up to about 150 C.

25. The method of claim 23, wherein the fibrillated fiber is thermally stable up to about 260 C.

* * * * *